United States Patent [19]

Kushi et al.

[11] Patent Number: 5,038,883
[45] Date of Patent: Aug. 13, 1991

[54] TRACTION CONTROL DEVICE FOR A VEHICLE

[75] Inventors: Naoto Kushi; Toshio Takaoka, both of Toyota, Japan

[73] Assignee: Toyota Jidosha Kabushiki Kaisha, Aichi, Japan

[21] Appl. No.: 486,975

[22] Filed: Mar. 1, 1990

[30] Foreign Application Priority Data

Mar. 6, 1989 [JP] Japan .................................. 1-53202

[51] Int. Cl.⁵ ........................................... B60K 28/16
[52] U.S. Cl. .............................. 180/197; 364/426.03; 123/333; 123/481
[58] Field of Search ................. 180/197; 123/198 DB, 123/332, 333, 481; 364/426.03

[56] References Cited

U.S. PATENT DOCUMENTS

| | | | |
|---|---|---|---|
| 3,938,612 | 2/1976 | Boudeville et al. | 180/197 |
| 4,432,430 | 2/1984 | Lind et al. | 180/197 |
| 4,506,638 | 3/1985 | Horii et al. | 123/333 |
| 4,550,704 | 11/1985 | Barho et al. | 123/481 |
| 4,721,176 | 1/1988 | Kabash et al. | 180/197 |
| 4,792,011 | 12/1988 | Stelter et al. | 180/197 |
| 4,804,058 | 2/1989 | Leiber et al. | 180/197 |
| 4,860,849 | 8/1989 | Andresson et al. | 123/333 |
| 4,921,064 | 5/1990 | Wazaki et al. | 364/426.01 |

FOREIGN PATENT DOCUMENTS

| | | | |
|---|---|---|---|
| 0298232 | 1/1989 | European Pat. Off. | |
| 53-30877 | 8/1978 | Japan. | |
| 58-8436 | 1/1983 | Japan. | |
| 151160 | 8/1985 | Japan | 180/197 |

Primary Examiner—Charles A. Marmor
Assistant Examiner—Mitchell Bompey
Attorney, Agent, or Firm—Kenyon & Kenyon

[57] ABSTRACT

A traction control device comprising a fuel supply control device for controlling the supply of fuel fed into the engine cylinders. When the temperature of the engine is high, if the speed difference between the rotating speed of the free running wheel and the rotating speed of the driven wheel exceeds a predetermined value, the supply of fuel fed into some of the cylinders or all of the cylinders is stopped. Conversely, when the temperature of the engine is low, even if the speed difference exceeds the predetermined value, the feeding of fuel to all of the cylinders is continued.

17 Claims, 8 Drawing Sheets

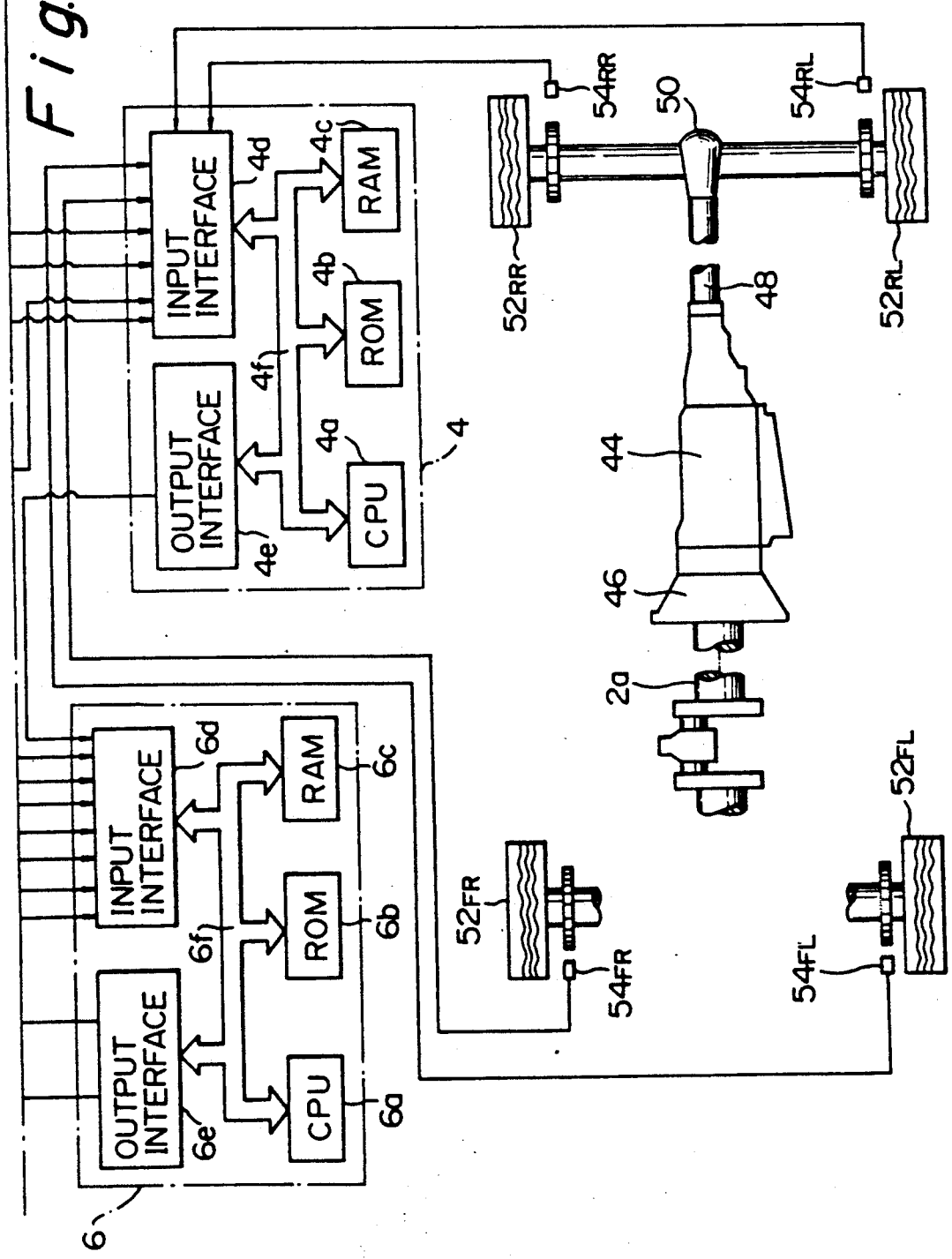
Fig. IB

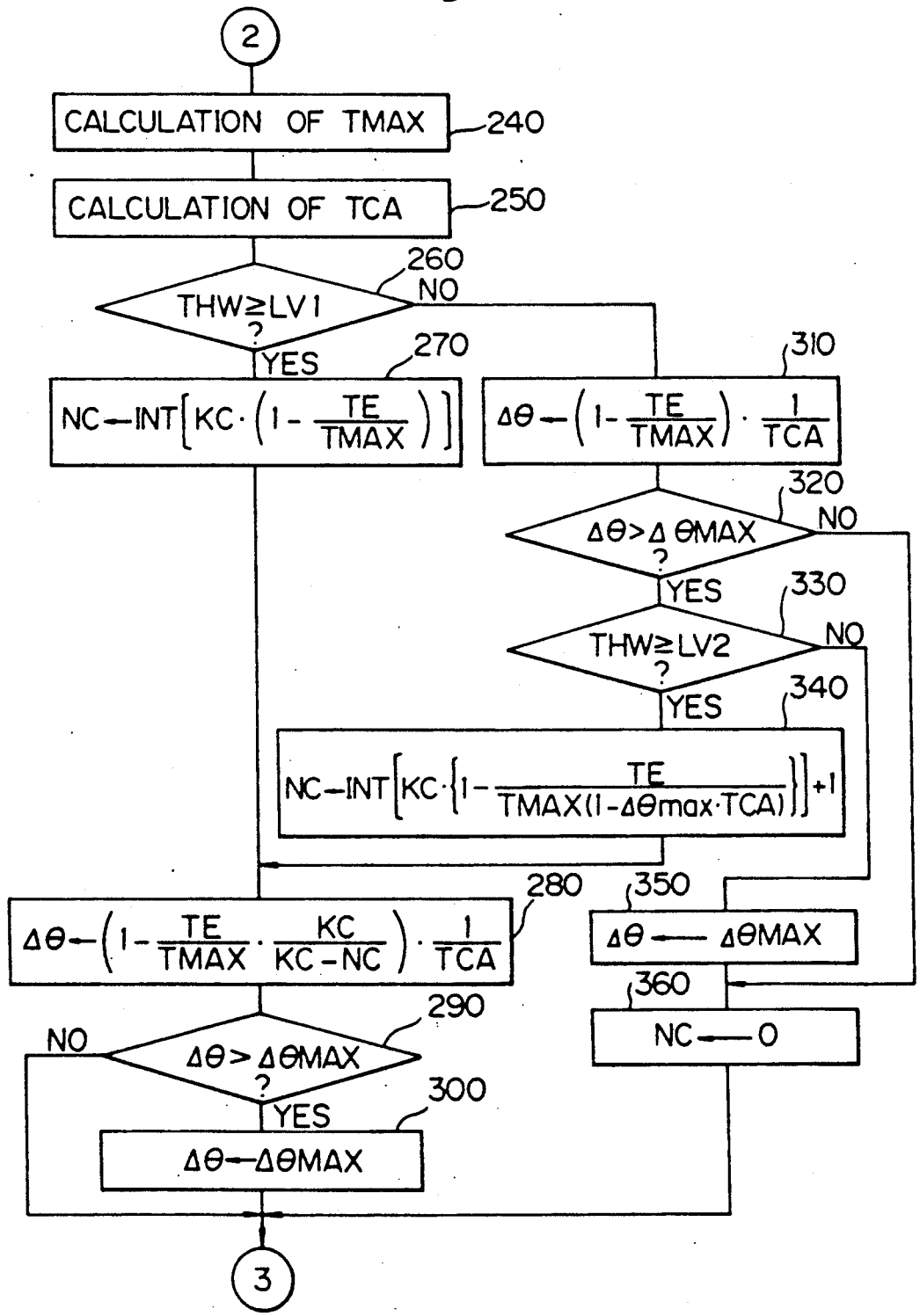

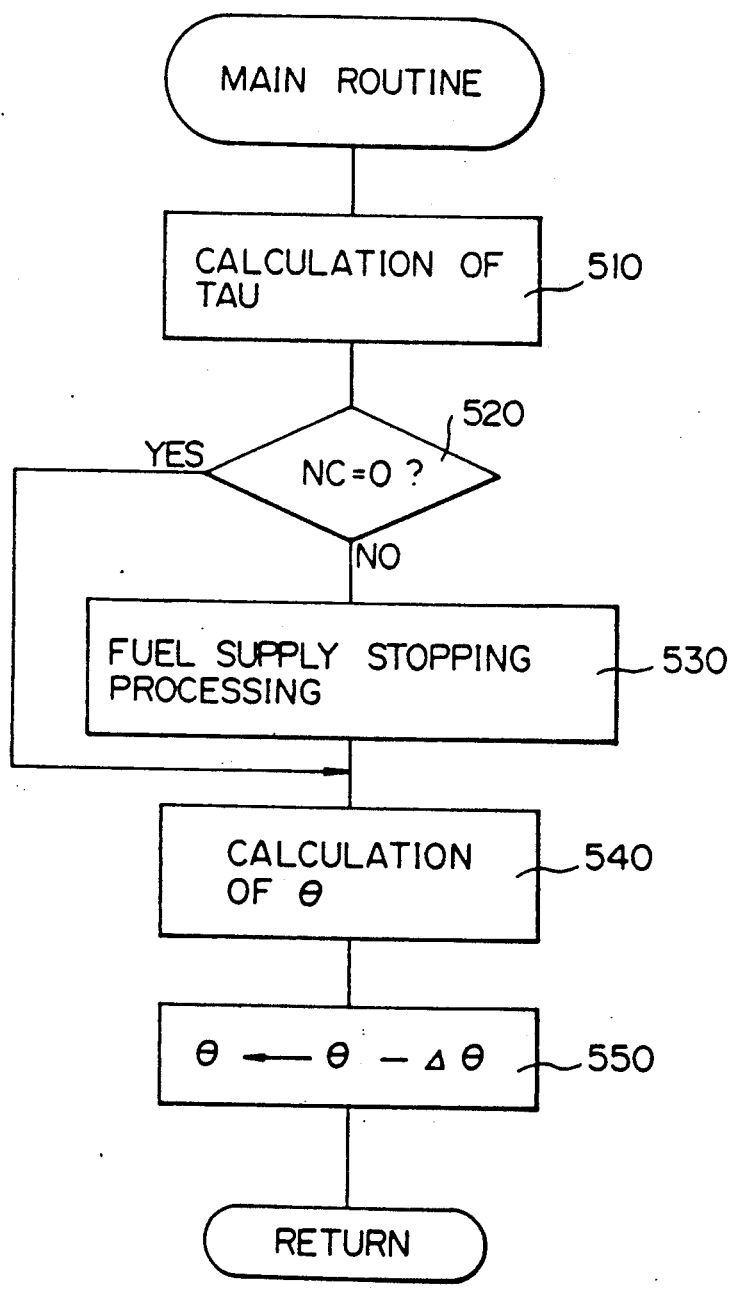

TRACTION CONTROL DEVICE FOR A VEHICLE

BACKGROUND OF THE INVENTION

1. Field of the Invention

The present invention relates to a traction control device for a vehicle.

2. Description of the Related Art

In a known engine, when the engine is accelerated, slippage of the driven wheel is detected by determining the difference between the speed of rotation of the free running wheel and the speed of rotation of the driven wheel, and when slippage of the driven wheel occurs, the output torque of the engine is reduced by stopping the supply of fuel fed into some of the engine cylinders (see Japanese Unexamined Patent Publication No. 58-8436). In this engine, the number of engine cylinders to which the supply of fuel is stopped is increased as the slippage becomes greater, and thus the output torque of the engine is controlled in accordance with the amount of slippage.

Nevertheless, when the temperature of the engine is low, since the temperature of the interior of the intake manifold is also low, the fuel injected by the fuel injectors cannot be easily vaporized, and thus a part of the fuel is temporarily accumulated on the inner wall of the intake manifold. Consequently, at this time, even if the supply of fuel to some of the engine cylinders is stopped, the fuel accumulating on the inner wall of the intake manifold seeps into some of the engine cylinders. At this time, however, the fuel fed into some of the engine cylinders cannot be burned or, even if the fuel is burned, a good combustion cannot be obtained, and consequently, a large amount of unburned HC is discharged into the exhaust passage. In addition, when the temperature of the engine is low, the amount of fuel injected by the fuel injectors is normally increased, and consequently, a large amount of unburned HC is discharged from the remaining engine cylinders to which the supply of fuel is not stopped. Therefore, when the temperature of the engine is low, if the supply of fuel for some of the engine cylinders is stopped, a large amount of unburned HC is discharged into the engine cylinders. Furthermore, if the supply of fuel for some of the engine cylinders is stopped, a large amount of oxygen is discharged into the exhaust passage from some of the engine cylinders. Consequently, since a large amount of unburned HC is burned in the exhaust passage, a problem occurs in that parts of the exhaust system, for example, the catalyst, are damaged due to the heat radiated during the burning of the unburned HC.

In addition, as mentioned above, even if the supply of fuel for some of the engine cylinders is stopped, since the fuel accumulating on the inner wall of the engine cylinders seeps into some of the engine cylinders, the fuel can be burned in some of the engine cylinders. At this time, however, since the amount of fuel fed into some of the engine cylinders is small, the burning time becomes long. Consequently, when the intake valve is opened, the burning gas flows back into the intake manifold, and thus a problem occurs in that the fuel adhering to the inner wall of the intake manifold is burned, i.e., a backfire occurs.

In another known engine, when slippage occurs at the driven wheel, the output torque of the engine is reduced by retarding the ignition timing (see Japanese Examined Patent Publication No. 53-30877), but a reduction in the output torque by retarding the ignition timing is limited, and thus a satisfactory traction control cannot be obtained.

SUMMARY OF THE INVENTION

An object of the present invention is to provide a traction control device capable of obtaining a good traction control when the temperature of the engine is high, and capable of preventing damage to parts of the exhaust system and backfiring when the temperature of the engine is low.

Therefore, according to the present invention, there is provided a traction control device of a vehicle having a free running wheel and a driven wheel driven by an engine having a plurality of cylinders, a fuel supply device for the cylinders and an ignition device for the cylinders, the traction control device comprising: means for detecting the rotating speed of the free running wheel; means for detecting the rotating speed of the driven wheel; speed difference calculating means for calculating a speed difference between the rotating speed of the free running wheel and the rotating speed of the driven wheel; temperature detecting means for detecting a temperature of the engine; and fuel supply control means for controlling the supply of fuel fed into the cylinders in response to the speed difference and the temperature of the engine to stop the supply of fuel fed into at least one cylinder when the speed difference exceeds a predetermined value and when the temperature of the engine is higher than a predetermined temperature and continuing the supply of fuel fed into all of the cylinders when the speed difference exceeds the predetermined value and when the temperature of the engine is lower than the predetermined temperature.

The present invention may be more fully understood from the description of preferred embodiments of the invention set forth below, together with the accompanying drawings.

BRIEF DESCRIPTION OF THE DRAWINGS

In drawings:

FIG. 4 is a flow chart of the main routine;

DESCRIPTION OF PREFERRED EMBODIMENTS

Figure 1A:
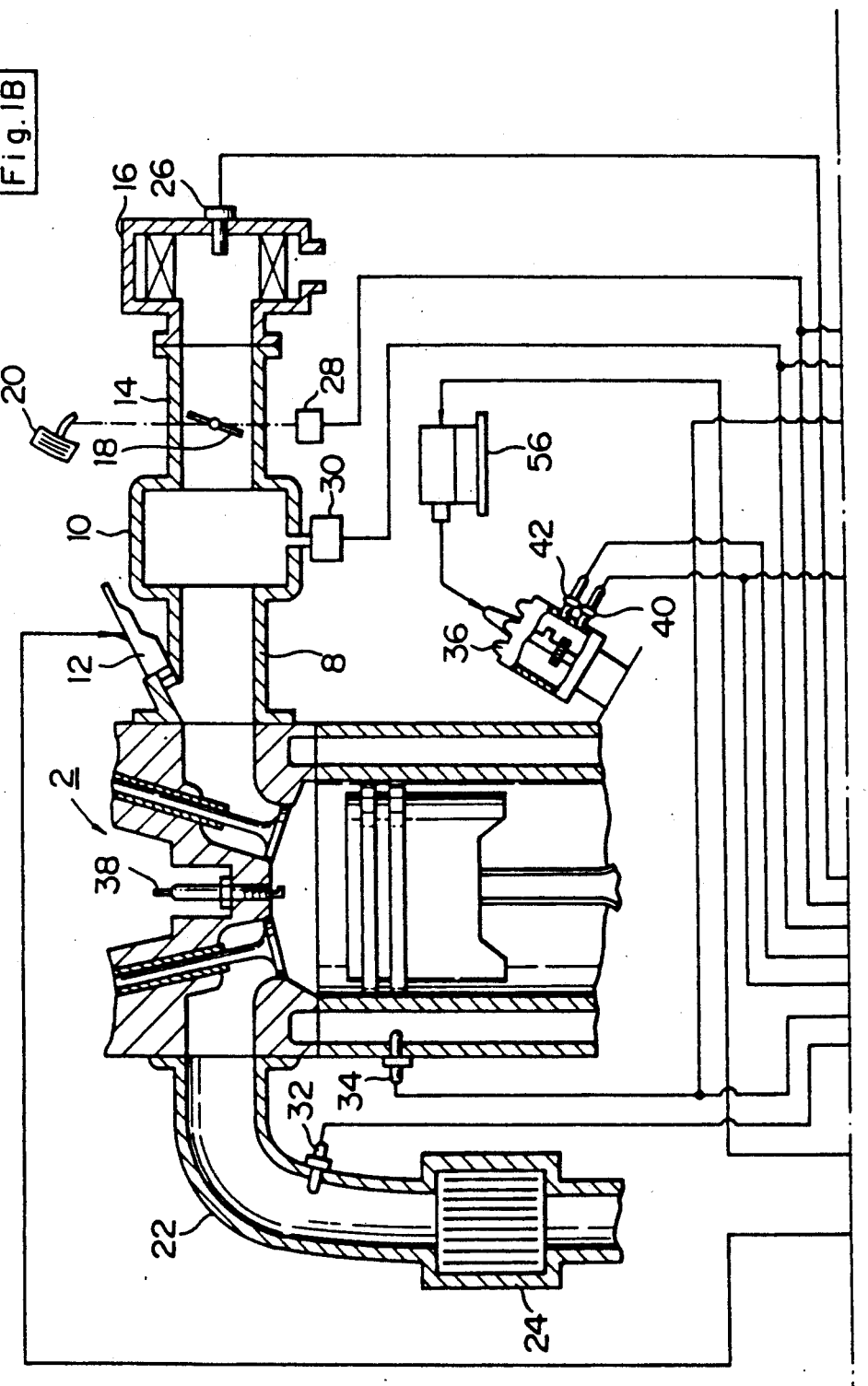
FIG. 1 is a schematically illustrated cross-sectional view of an engine.
Figure 2:
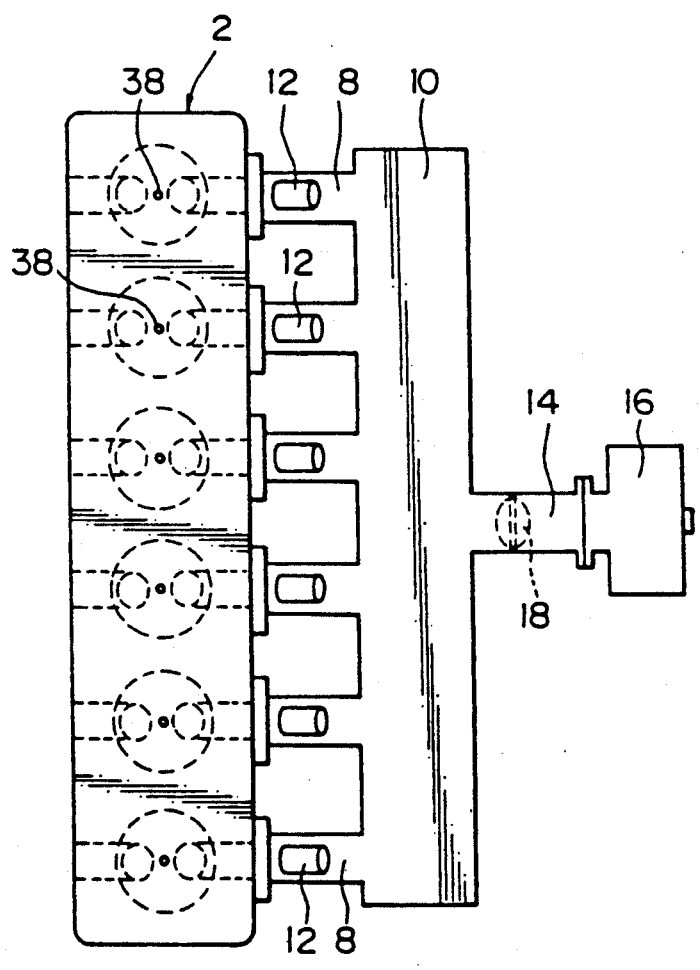
FIG. 2 is a plan view of the engine illustrated in FIG. 1.

FIGS. 1 and 2 illustrate a case where the present invention is applied to a vehicle using a front engine-rear drive system.

Referring to FIGS. 1 and 2, 2 designates a six-cylinder engine, 4 a first electronic control unit 4 for calculating various control quantities used for controlling the output torque of the engine 2, and 4 a second electronic control unit for executing the controls of the fuel injection and the ignition time on the basis of signals output from the first electronic control unit 4. The cylinders of the engine 2 are connected to a surge tank 10 via corresponding branches 8, and fuel injectors 12 are mounted on the corresponding branches 8. The surge tank 10 is connected to an air cleaner 16 via an intake duct 14, and a throttle valve 18 connected to an accelerator pedal 20 is arranged in the intake duct 14. Further, the cylinders of the engine are connected to a three-way catalytic converter 24 via an exhaust manifold 22.

The first electronic control unit 4 is constructed as a digital computer and comprises a CPU (microprocessor, etc.) 4a, a ROM (read only memory) 4b, a RAM (random access memory) 4c, an input interface 4d and an output interface 4e. The CPU 4a, the ROM 4b, the RAM 4c, the input interface 4d and the output interface 4e are interconnected via a bidirectional bus 4f.

The second electronic control unit 6 is also constructed as a digital computer and comprises a CPU 6a, a ROM 6b, a RAM 6c, an input interface 6d and an output interface 6e. The CPU 6a, the ROM 6b, the RAM 6c, the input interface 6d and the output interface 6e are interconnected via a bidirectional bus 6f.

An air temperature sensor 26 producing an output voltage proportional to the temperature of air is arranged in the air cleaner 16, and the output voltage of the air temperature sensor 26 is input to the input interface 6d. A throttle sensor 28 producing an output voltage proportional to the degree of opening of the throttle valve 14 is attached to the throttle valve 14, and the output voltage of the throttle sensor 28 is input to the input interfaces 4d and 6d. A pressure sensor 30 producing an output voltage proportional to the absolute pressure in the surge tank 10 is attached to the surge tank 10, and the output voltage of the pressure sensor 30 is input to the input interfaces 4d and 6d. An oxygen concentration detector 32 producing an output voltage which is abruptly changed at the stoichiometric air-fuel ratio is arranged in the exhaust manifold 22, and the output voltage of the oxygen concentration detector 32 is input to the input interface 6d. A coolant temperature sensor 34 producing an output voltage proportional to the temperature of the engine coolant is mounted on the body of the engine 2, and the output voltage of the coolant temperature sensor 34 is input to the input interfaces 4d and 6d. Further, a distributor 36 is mounted on the body of the engine 2 to distribute an ignition current to spark plugs 38, and a crankangle sensor 40 and a cylinder discriminating sensor 42 are arranged in the distributor 36. The crankangle sensor 40 produces an output pulse at each revolution of 30 degrees of the crankshaft 2a of the engine 2, these output pulses are input to the input interfaces 4d and 6d, and the engine speed is calculated from these output pulses in the electronic control units 4 and 6. The cylinder discriminating sensor 42 produces an output pulse at each two revolutions of the crankshaft 2a, and thus the particular fuel injector 12 and spark plug 38 to be operated can be determined from this output pulse.

As illustrated in FIG. 1, the crankshaft 2a of the engine 2 is connected to an automatic transmission 44 via torque converter 46, and the output shaft 48 of the automatic transmission 44 is connected to rear wheels 52RR and 52RL via a differential gear 50. Consequently, in the embodiment illustrated in FIG. 1, the rear wheels 52RR and 52RL are the driven wheels, and the front wheels 52FR and 52FL are the free running wheels. A driven wheel speed sensor 54RR is provided for the driven wheel 52RR. This sensor 54RR produces an output pulse at each revolution by a predetermined angle of the driven wheel 52RR, these output pulses of the sensor 54RR are input to the input interface 4d, and the rotating speed of the driven wheel 52RR is calculated in the electronic control unit 4 from these output pulses. Another driven wheel speed sensor 54RL is provided for the driven wheel 52RL. This sensor 54RL produces an output pulse at each revolution by a predetermined angle of the driven wheel 52RL, these output pulses of the sensor 54RL are input to the input interface 4d, and the rotating speed of the driven wheel 52RL is calculated in the electronic control unit 4, from these output pulses. In addition, a free running wheel speed sensor 54FR is provided for the free running wheel 52FR. This sensor 54FR produces an output pulse at each revolution of a predetermined angle of the free running wheel 52FR, these output pulses of the sensor 54FR are input to the input interface 4d, and the rotating speed of the free running wheel 52FR is calculated in the electronic control unit 4, from these output pulses. Another free running wheel speed sensor 54FL is provided for the free running wheel 52FL. This sensor 54FL produces an output pulse each revolution of a predetermined angle of the free running wheel 52FL, these output pulses of the sensor 54FL are input to the input interface 4d, and the rotating speed of free running wheel 52FL is calculated in the electronic control unit 4, from these output pulses.

The output interface 4e of the first electronic control unit 4 is connected to the input interface 6d of the second electronic control unit 6. The output interface 6e of the second electronic control unit 6 is connected, on one hand, to the fuel injectors 12, and on the other hand, to the distributor 36 via an ignitor 56.

Figure 3A:
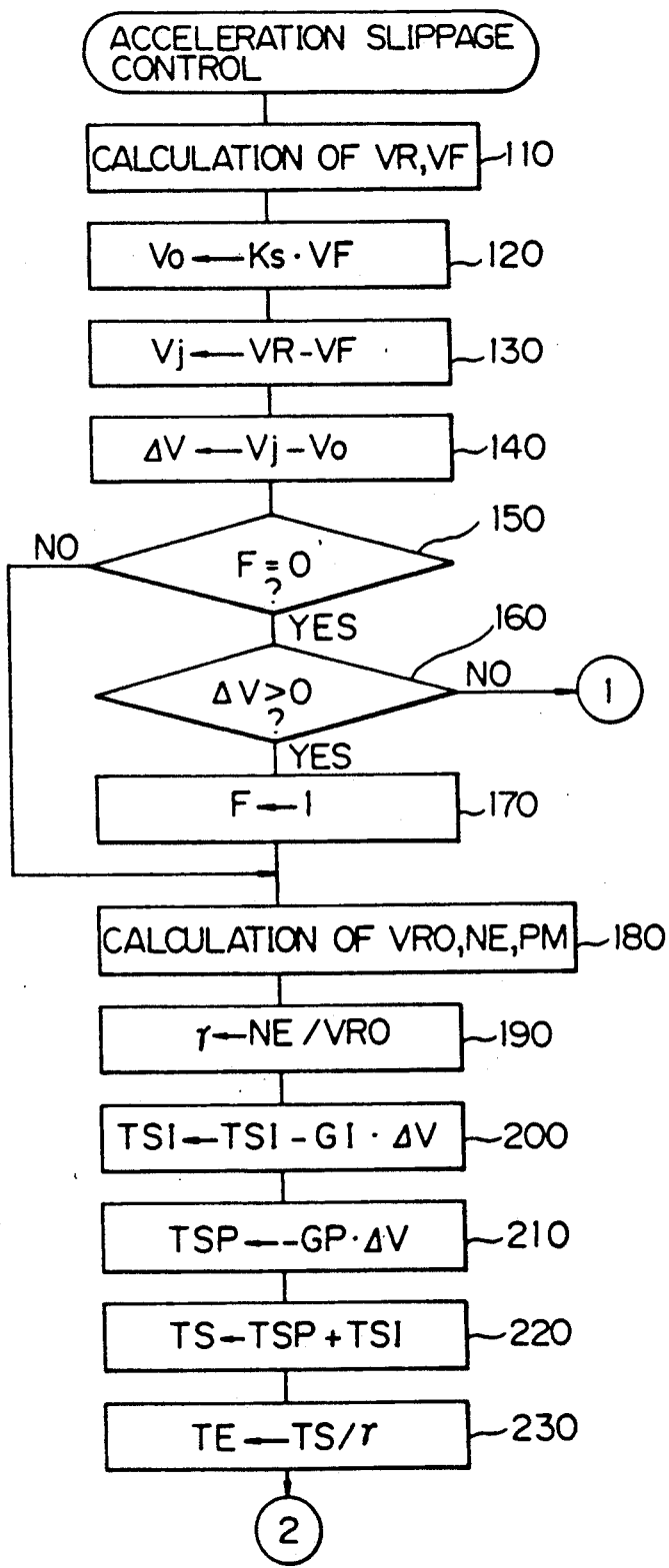
FIG. 3 is a flow chart for executing the acceleration slippage control.
Figure 3C:
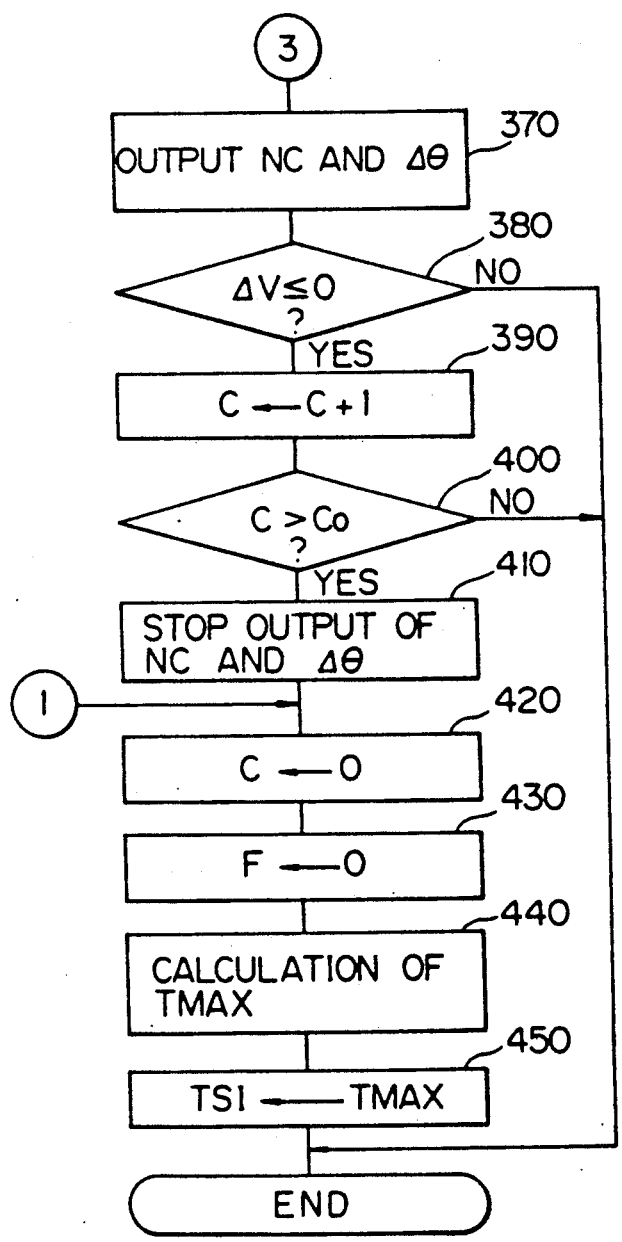

FIG. 3 illustrates a routine for executing the acceleration slippage control, and this routine is processed by sequential interruptions executed at predetermined intervals in the first electronic control unit 4.

Referring to FIG. 3, in step 110, the apparent vehicle speed VR and the actual vehicle speed VF are calculated from the output signals of the speed sensors 54RR, 54RL, 54FL and 54FL. In this embodiment, the higher of the rotating speeds of the driven wheels 52RR and 52RL is memorized as the apparent vehicle speed VR, and the higher of the rotating speeds of the free running wheels 52FR and 52FL is memorized as the actual vehicle speed VF. Then, in step 120, a target slippage amount $V_0$ of the driven wheels 52RR and 52RL is calculated by multiplying the actual vehicle speed VF by a predetermined target slippage rate Ks (for example 0.1), and in step 130, the actual slippage amount Vj is calculated by subtracting the actual vehicle speed VF from the apparent vehicle speed VR. Then, in step 140, the speed difference $\Delta V$ between the actual slippage amount Vj and the target slippage amount $V_0$ is calculated. In this embodiment, when the actual slippage amount Vj exceeds the target slippage amount $V_0$, i.e., when $\Delta V$ is positive, the acceleration slippage control is carried out.

Then, in step 150, it is determined whether or not a flag F indicating that the acceleration slippage control is being carried out is set. When the flag F is reset, i.e., when the acceleration slippage control is not being carried out, the routine goes to step 160 and it is determined whether or not the speed difference $\Delta V$ is positive. If $\Delta V \leq 0$, it is determined that the slippage of the driven wheels 52RR or 52RL has not occurred, and the routine jumps to step 420. In step 420, the counter C is cleared, and then in step 430 the flag F is reset. Then, in step 440, the maximum torque TMAX of the engine 2 is calculated on the basis of the engine speed NE and the absolute pressure PM. That is, at this time, since the traction control is not carried out, the engine 2 outputs the maximum torque TMAX determined by the engine speed NE and the absolute pressure PM. This maximum torque TMAX is stored in the ROM 4b in the form of a map illustrated in FIG. 5. Then, in step 450, the maximum torque TMAX is memorized as the integral term TSI for the driven wheel target torque, and thus the processing routine is completed.

Conversely, if $\Delta V > 0$, it is determined that the slippage of the driven wheel 52RR or 52RL has occurred. At this time, the routine goes from step 160 to step 170 and the flag F is set. Then the routine goes to step 180 and the acceleration slippage control is started. Once the flag F is set, the routine jumps thereafter from steps 150 to 180 until the flag F is reset.

In step 180, the mean value VRO of the rotating speeds of the driven wheels 52RR and 52RL is calculated from the signals output from the driven wheel speed sensors 54RR and 54RL. In addition, the engine speed NE is calculated from the output signal of the crankangle sensor 40, and the absolute pressure PM in the surge tank 10 is calculated from the output signal of the pressure sensor 30. Then, in step 190, the speed reduction ratio $\gamma(=NE/VRO)$ in the system transmitting a torque between the engine 2 and the driven wheels 52RR, 52RL is calculated. This speed reduction rate $\gamma$ becomes large as a reduction in speed in the torque transmitting system becomes large.

Then, in step 200, the integral term TSI for the driven wheel target speed is renewed by the following equation.

$$TSI = TSI - GI \cdot \Delta V \qquad (1)$$

where GI is a predetermined integral constant.

This integral term TSI becomes equal to the maximum torque TMAX before the routine initially goes to step 200 after $\Delta V$ becomes positive.

Then, in step 210, the proportional term TSP for the driven wheel target torque is calculated from the following equation.

$$TSP = -GP \cdot \Delta V \qquad (2)$$

where GP is a predetermined proportional constant.

Then, in step 220, the driven wheel target torque TS is calculated by adding the integral term TSI and the proportional term TSP, and in step 230, the target output torque TE of the engine 2, which corresponds to the driven wheel target torque TS, is calculated by dividing the driven wheel target torque TS by the speed reduction rate $\gamma$. This target output torque TE indicates an output torque to which the output torque of the engine 2 must be reduced.

Figure 5:
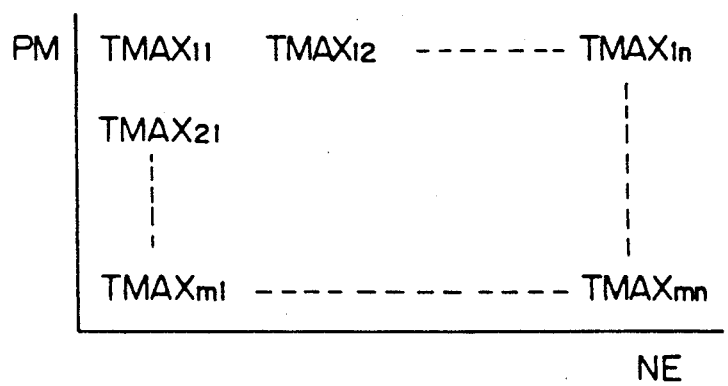
FIG. 5 is a view illustrating the map.
Figure 6:
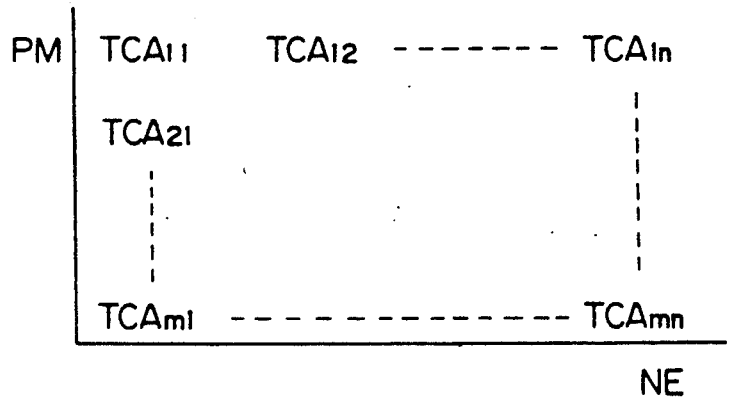
FIG. 6 is a view illustrating the map.

Then, in step 240, the maximum torque TMAX is calculated from the map illustrated in FIG. 5 and in step 250, the output torque reduction rate TCA is calculated on the basis of the engine speed NE and absolute pressure PM. This output torque reduction rate TCA indicates a rate of the output torque of the engine 2, which can be reduced by retarding the ignition timing by one degree where fuel is fed into all of the cylinders, i.e., where the engine 2 is outputting the maximum torque TMAX. The output torque reduction rate TCA has been obtained by experiment and is stored in the ROM 4b in the form of a map illustrated in FIG. 6.

Then, in step 260, it is determined on the basis of the output signal of the coolant temperature 34 whether or not the temperature of the engine coolant THW is higher than a predetermined temperature LV1. If $THW \geq LV1$, the routine goes to step 270, and the number of the cylinders NC in which the supply of fuel is to be stopped is calculated from the following equation.

$$NC = INT[KC \cdot \{1 - (TE/TMAX)\}] \qquad (3)$$

where KC indicates the total number of cylinders (in this embodiment, KC=6), and INT indicates an integer obtained by eliminating figures below a decimal point in the bracket.

That is, in the above equation (3), $\{1-(TE/TMAX)\}$ indicates an overall rate of the output torque of the engine 2, which should be reduced, and thus $KC \cdot \{1-(TE/TMAX)\}$ indicates the number of the cylinders in which the supply of fuel should be stopped. Consequently, for example, if the result of the calculation of $[KC \cdot \{1-(TE/TMAX)\}]$ becomes equal to 2.65, this means that the supply of fuel fed into two point six five cylinders should be stopped. In this case, however, since NC of the equation (3) becomes equal to 2, the rate of the output torque of the engine 2, which should be reduced, is still higher by 0.65. Consequently, this excessive output torque must be reduced. In the next step 280, this excessive output torque is reduced by retarding the ignition timing, which retarding value $\Delta \theta$ of the ignition timing is calculated from the following equation.

$$\Delta \theta = \left(1 - \frac{TE}{TMAX} \cdot \frac{KC}{KC - NC}\right) \cdot \frac{1}{TCA} \qquad (4)$$

That is, $$\Delta \theta = \left(1 - \frac{TE}{TMAX \cdot \frac{KC - NC}{KC}}\right) \cdot \frac{1}{TCA} \qquad (4')$$

In the above equation (4'), $$TMAX \cdot \frac{KC - NC}{KC}$$

indicates the maximum torque obtained when the supply of fuel fed into the cylinders of NC units is stopped. Consequently, $$\left(1 - \frac{TE}{TMAX} \cdot \frac{KC}{KC - NC}\right)$$

indicates a part of the overall rate of the output torque of the engine 2, which part cannot be reduced by stopping the supply of fuel fed into the cylinders of NC units. Therefore, $\Delta \theta$ indicates the retarding value of the ignition timing able to cause a reduction in the above-mentioned part of the overall rate of the output torque of the engine 2.

Then, in step 290, it is determined whether or not the retarding value $\Delta \theta$ of the ignition timing exceeds a predetermined maximum retarding value $\Delta \theta_{max}$ which can obtain a further reduction in the output torque than when the supply of fuel for one cylinder is stopped. If $\Delta \theta > \Delta \theta_{max}$, the routine goes to step 300, and $\Delta \theta_{max}$ is memorized as $\Delta \theta$.

When the temperature of the engine 2 is high, the amount of fuel accumulating on the inner wall of the intake ports is very small. Consequently, at this time, even if the supply of fuel is stopped, there is no danger that combustion will occur or that a large amount of unburned HC will be discharged into the exhaust passage. Therefore, when the temperature THW of the engine coolant is higher than LV1, the supply of fuel fed into some of the cylinders or all of the cylinders is stopped.

Conversely, when it is determined in step 260 that the temperature THW of the engine coolant is lower than the predetermined temperature LVI, the routine goes to step 310, and the retarding value $\Delta\theta$ of the ignition timing is calculated from the following equation.

$$\Delta\theta = \left(1 - \frac{TE}{TMAX}\right) \cdot \frac{1}{TCA} \quad (5)$$

Then, in step 320, it is determined whether or not the retarding value $\Delta\theta$ of the ignition timing is greater than the maximum retarding value $\Delta\theta_{max}$, i.e., whether or not the output torque of the engine 2 can be reduced to the target output torque only by retarding the ignition timing. If $\Delta\theta \leq \Delta\theta_{max}$, i.e., when the output torque of the engine 2 can be reduced to the target output torque, the routine jumps to step 360 and NC is made zero. Consequently, at this time, the supply of fuel is not stopped.

Conversely, if $\Delta\theta > \Delta\theta_{max}$, i.e., when the output torque of the engine 2 can reduced to the target output torque only by retarding the ignition timing, the routine goes from step 320 to step 330, and it is determined whether or not the temperature THW of the engine coolant is higher than a predetermined temperature LV2, which is lower than the predetermined temperature LV1. If THW<LV2, the routine goes to step 350, and the retarding value $\Delta\theta$ of the ignition timing is made the maximum retarding value $\Delta\theta_{max}$. Then, in step 360, NC is made zero, and thus at this time the supply of fuel is not stopped.

When the temperature of the engine 2 is low, if the supply of fuel is stopped a large amount of unburned HC is discharged into the exhaust passage, and thus parts of the exhaust system will be damaged due to heat generated by the burning of the unburned HC, as mentioned before. Also, there is a danger of backfiring. Consequently, when the temperature THW of the engine coolant is lower than the predetermined temperature LV2, the supply of fuel is not stopped. In the embodiment illustrated in FIG. 3, the ignition timing is retarded to the maximum retarding value $\Delta\theta_{max}$ to reduce the output torque of the engine 2 as much as possible. At this time, however, the ignition timing may be maintained as it stands without such retarding.

Conversely, when it is determined in step 330 that the temperature THW is higher than the predetermined temperature LV2, the routine goes to step 340, and the number of the cylinders NC in which the supply of fuel should be stopped is calculated from the following equation.

$$NC = INT\left[KC \cdot \left(1 - \frac{TE}{TMAX(1 - \Delta\theta_{max} \cdot TCA)}\right)\right] + 1 \quad (6)$$

In the above equation, $\Delta\theta_{max} \cdot TCA$ indicates the rate of reduction in the output torque of the engine 2, which rate is obtained by retarding the ignition timing by the maximum retarding value $\Delta\theta_{max}$ where fuel is fed into all of the cylinders. Consequently, $TMAX(1 - \Delta\theta_{max} \cdot TCA)$ indicates the reduction of the output torque obtained by retarding the ignition time by the maximum retarding value $\Delta\theta_{max}$.

Therefore, $$\left(1 - \frac{TE}{TMAX(1 - \Delta\theta_{max} \cdot TCA)}\right] + 1$$

indicates a remaining part of the rate of reduction in the output torque, which remaining part can not be reduced only by retarding the ignition timing by the maximum retarding value $\Delta\theta_{max}$ where fuel is fed into all of the cylinders. Consequently, if $$\left(1 - \frac{TE}{TMAX(1 - \Delta\theta_{max} \cdot TCA)}\right] + 1$$

is a positive value, NC becomes a positive integer. For example, if the result of the calculation $$\left(1 - \frac{TE}{TMAX(1 - \Delta\theta_{max} \cdot TCA)}\right] + 1$$

becomes equal to, for example, 1.35, NC is made 2. Then the routine goes to step 280, and the retarding value $\Delta\theta$ of the ignition timing is calculated.

After NC and $\Delta\theta$ are calculated as mentioned above, the routine goes to step 370 and NC and $\Delta\theta$ are output to the output interface 4e. Then NC and $\Delta\theta$ are input to the input interface 6d of the second electronic control unit 6, and the control of stopping the supply of fuel and the control of retarding the ignition timing are carried out.

FIG. 4 illustrates a main routine for executing these controls.

Referring to FIG. 4, in step 510 the optimum fuel injection time TAU is calculated, and in step 520, it is determined whether or not NC is equal to zero. When NC is not equal to zero, the routine goes to step 530 and the number of cylinders in which the supply of fuel is to be stopped is determined on the basis of the figures of NC. For example, if NC=1, the supply of fuel fed into the cylinder in which the next fuel injection is to be carried out remains stopped. If NC=2, the supply of fuel fed into two cylinders in which the next fuel injection and the successive fuel injection are to be carried out remains stopped. That is, if NC=i, the supply of fuel fed into i cylinders remains stopped.

In step 540, the optimum ignition timing value $\theta$ is calculated, and then in step 550 the actual ignition timing value $\theta$ is calculated by subtracting $\Delta\theta$ from the optimum ignition timing value $\theta$.

Turning to FIG. 3, in the next step 380 it is determined whether or not $\Delta V$ is smaller than zero. If $\Delta V>0$, i.e., when the slippage of the driven wheels 52RR or 52RL is still occurring, the processing cycle is completed and thus the acceleration slippage control continues to be carried out.

Conversely, if $\Delta V \leq 0$, i.e., when the slippage of the driven wheels 52RR or 52RL is eliminated, the routine goes to step 390 and the count value C is incremented by one. Then, in step 400, it is determined whether or not the count value C exceeds a predetermined value $C_0$. If $C>C_0$, it is determined that the slippage of the drive wheels 52RR or 52RL will not again occur. Consequently, at this time, the routine goes to 410, and the output of NC and $\Delta\theta$ is stopped. At this time, in the main routine illustrated in FIG. 4, it is determined that both NC and $\Delta\theta$ are equal to zero and the routine then goes to step 420.

As mentioned above, in the present invention, basically where the slippage of the driven wheels 52RR or 52RL occurs, if the temperature of the engine is high, the supply of fuel for some of the cylinders or all of the cylinders is stopped, and if the temperature of the engine is low, the supply of fuel is not stopped. Consequently, when the temperature of the engine is high, a good traction control can be obtained. Conversely, when the temperature of the engine is low, although a traction control is not carried out, it is possible to prevent damage to parts of the exhaust system and to prevent backfiring. In general, the time during which the temperature of the engine is low is short, and thus it is possible to stop the traction control during this time. Nevertheless, it would be preferable, of course, to carry out the traction control when the temperature of the engine is low. In this case, it is possible to carry out the traction control by retarding the ignition timing as illustrated in the embodiment shown in FIG. 3.

In the embodiment illustrated in FIG. 3, when the temperature of the engine is slightly high, i.e., when the temperature THW of the engine coolant is in the range from LV2 to LV1, the supply of fuel is stopped only when the output torque of the engine 2 cannot be sufficiently reduced by retarding the ignition timing by the maximum retarding value $\Delta\theta_{max}$. Namely, at this time since the retarding of the ignition timing is given priority, it is possible to suppress damage to parts of the exhaust system and backfiring.

In addition, the target torque TE may be calculated directly from $\Delta V$ by using a map.

Furthermore, by using a detecting device for detecting the friction coefficient of a road by detecting the roughness of the road from ultrasonic waves reflected from the surface thereof, or by using a manual switch for determining the friction coefficient of a road by choosing the state of the road in accordance with the condition thereof, i.e., snow, rain or icing, $\Delta V$ may be calculated from the friction coefficient of the road and the rotating speeds of the driven wheels 52RR and 52RL.

Further, by arranging a subthrottle valve in the intake passage in addition to the throttle valve 18, the traction control may be carried out by controlling the subthrottle valve and the ignition timing when the temperature of the engine is low.

While the invention has been described by reference to specific embodiments chosen for purposes of illustration, it should be apparent that numerous modifications could be made thereto by those skilled in the art without departing from the basic concept and scope of the invention.

We claim:

1. A traction control device of a vehicle having a free running wheel and a driven wheel driven by an engine having a plurality of cylinders, a fuel supply device for the cylinders and an ignition device for the cylinders, said traction control device comprising:

means for detecting the rotating speed of the free running wheel;

means for detecting the rotating speed of the driven wheel;

speed difference calculating means for calculating a speed difference between the rotating speed of the free running wheel and the rotating speed of the driven wheel;

temperature detecting means for detecting an internal temperature of the engine; and fuel supply control means for controlling the supply of fuel fed into the cylinders in response to said speed difference and said temperature of the engine to stop the supply of fuel fed into at least one cylinder when said speed difference exceeds a predetermined value and when said temperature of the engine is higher than a predetermined temperature and continuing the supply of fuel fed into all of the cylinders when said speed difference exceeds said predetermined value and when said temperature of the engine is lower than said predetermined temperature.

2. A traction control device according to claim 1, wherein said fuel supply control means stops the supply of fuel fed into all of the cylinders.

3. A traction control device according to claim 1, wherein said fuel supply control means controls the number of cylinders in which the supply of fuel is to be stopped in accordance with an overall rate of reduction in the output torque of the engine to be reduced.

4. A traction control device according to claim 3, wherein said overall rate of reduction in the output torque of the engine is determined by said speed difference and a ratio of an engine speed to the rotating speed of the driven wheel and is increased as said speed difference becomes large, and said overall rate of reduction of the output torque of the engine is increased as said ratio is decreased.

5. A traction control device according to claim 3, wherein the number of the cylinders in which the supply of fuel is to be stopped is calculated from the following equation $$NC = INT(KC \cdot \Delta R)$$

where
NC: number of cylinders in which the supply of fuel is to be stopped.
KC: the total number of cylinders.
$\Delta R$: said overall rate of reduction of the output torque of the engine.
INT: a symbol indicating a function of eliminating the figures of ($KC \cdot \Delta R$) below a decimal point.

6. A traction control device according to claim 3, further comprising ignition control means for retarding an ignition timing when the supply of fuel fed into at least one cylinder is stopped.

7. A traction control device according to claim 6, wherein said ignition control means retards the ignition timing by a degree which causes the reduction in a part of said overall rate of reduction of the output torque by the engine, which cannot be reduced by stopping the supply of fuel.

8. A traction control device according to claim 7, wherein a rate of reduction of the output torque of the engine, which rate is obtained by retarding the ignition timing by a unit degree, is stored in a memory, and a retarding value of the ignition timing is calculated from said part of said overall rate of reduction and said rate of reduction of the output torque of the engine stored in said memory.

9. A traction control device according to claim 1, further comprising ignition control means for retarding an ignition timing when said speed difference exceeds said predetermined value and when said temperature of the engine is lower than said predetermined temperature.

10. A traction control device according to claim 9, wherein said ignition control means controls the ignition timing in accordance with an overall rate of reduction of the output torque of the engine to be reduced to increase a retarding value of the ignition timing as said overall rate of reduction of the output torque of the engine is increased.

11. A traction control device according to claim 10, wherein said overall rate of reduction of the output torque of the engine is determined by said speed difference and a ratio of an engine speed to the rotating speed of the driven wheel and increased as said speed difference becomes large, and said overall rate of reduction of the output torque of the engine is increased as said ratio is decreased.

12. A traction control device according to claim 10, wherein a rate of reduction of the output torque of the engine, which rate is obtained by retarding the ignition timing by a unit degree, is stored in a memory, and the retarding value of the ignition timing is calculated from the following equation $$\Delta\theta = \Delta R / TCA$$

where $\Delta\theta$: the retarding value of the ignition timing.
$\Delta R$: said overall rate of reduction of the output torque of the engine.
TCA: said rate of reduction of the output torque of the engine stored in said memory.

13. A traction control device according to claim 10, wherein said ignition control means controls the retarding of the ignition timing to maintain the retarding value of the ignition timing at a predetermined maximum retarding value when the retarding value of the ignition timing exceeds said predetermined maximum retarding value.

14. A traction control device according to claim 1, further comprising ignition control means for controlling an ignition timing in accordance with an overall rate of reduction of the output torque of the engine to be reduced to increase a retarding value of the ignition timing as said overall rate of reduction of the output torque of the engine is increased when said speed difference exceeds said predetermined value and when said temperature of the engine is in the range from said predetermined temperature to a higher predetermined temperature, said fuel supply control means stopping the supply of fuel fed into at least one cylinder only when the output torque of the engine cannot be reduced by a torque corresponding to said overall rate of reduction of the output torque of the engine even if the ignition timing is retarded by a predetermined maximum retarding value.

15. A traction control device according to claim 14, wherein said fuel supply control means controls the number of cylinders in which the supply of fuel is to be stopped in accordance with a part of said overall ratio of reduction of the output torque of the engine, which part cannot be reduced only by retarding the ignition timing by said maximum retarding value.

16. A traction control device according to claim 15, wherein said ignition control means retards the ignition timing by a degree which causes the reduction in a part of said overall rate of reduction of the output torque of the engine, which part cannot be reduced by stopping the supply of fuel.

17. The traction control device according to claim 1 wherein said temperature detection means comprises a coolant temperature sensor for producing a signal proportional to the temperature of the engine's coolant.

* * * * *